US012291838B2

(12) United States Patent
Gateau et al.

(10) Patent No.: US 12,291,838 B2
(45) Date of Patent: May 6, 2025

(54) CONSTRUCTION EQUIPMENT PROVIDED WITH A SPECIFIC ARRANGEMENT TO ALLOW TITLING MOVEMENT WITHIN ELECTRIC ACTUATOR

(71) Applicant: Volvo Construction Equipment AB, Eskilstuna (SE)

(72) Inventors: Alexandre Gateau, Tresserve (FR); Ludovic Maxant, Viviers du Lac (FR); Gauthier Brunet, Lyons (FR); Henrik Strand, Eskilstuna (SE); Sylvain Houel, Le Bourget du Lac (FR)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 18/480,852

(22) Filed: Oct. 4, 2023

(65) Prior Publication Data

US 2024/0117591 A1    Apr. 11, 2024

(30) Foreign Application Priority Data

Oct. 6, 2022    (EP) .................................... 22200074

(51) Int. Cl.
*E02F 3/42*    (2006.01)
(52) U.S. Cl.
CPC .............. *E02F 3/425* (2013.01); *E02F 3/427* (2013.01)
(58) Field of Classification Search
CPC .. F16H 2025/2037; F16H 25/20; E02F 3/427; E02F 3/425; E02F 3/422
See application file for complete search history.

(56) References Cited

U.S. PATENT DOCUMENTS 2,918,786 A * 12/1959 Geyer ..................... F16H 25/20
                                                                        92/24
6,337,547 B1 * 1/2002 Jouan de Kervenoael ..................
                                                                        B25J 9/102
                                                                        901/26

(Continued)

FOREIGN PATENT DOCUMENTS

CN    203008004 U    6/2013
EP    4036316 A1    8/2022

(Continued)

OTHER PUBLICATIONS

European Search Report and Written Opinion in corresponding European Application No. 22200074.7 dated Feb. 24, 2023 (7 pages).

(Continued)

*Primary Examiner* — Jake Cook
(74) *Attorney, Agent, or Firm* — Venable LLP; Jeffri A. Kaminski

(57) ABSTRACT

Construction equipment includes a framework and at least one electric actuator for moving at least one element of the framework. The actuator includes a ball or roller screw system having a threaded rod and a nut forming a helical connection with the threaded rod. An electric motor drives the rod in rotation around a longitudinal axis, forcing the nut to move axially along the rod. A carriage is axially connected with the nut. An axial guide guides the movement of the carriage. The guide is fixed to the framework. At least one support element connects, directly or indirectly, the threaded rod to framework. The support element is designed so that threaded rod can tilt, to some extent, relative to framework around any axis perpendicular to rod longitudinal axis.

11 Claims, 11 Drawing Sheets

(56) References Cited

U.S. PATENT DOCUMENTS

| | | | | |
|---|---|---|---|---|
| 8,291,782 B1* | 10/2012 | Shaheen | ............ | F16H 25/2472 |
| | | | | 74/89.34 |
| 8,960,031 B2* | 2/2015 | Keech | .................. | F16H 25/205 |
| | | | | 244/99.3 |
| 10,228,046 B2 | 3/2019 | Parmar | | |
| 2013/0112022 A1 | 5/2013 | Shimizu | | |
| 2022/0243421 A1* | 8/2022 | Gateau | ..................... | H02K 7/06 |

FOREIGN PATENT DOCUMENTS

| | | |
|---|---|---|
| JP | S63300131 A | 12/1988 |
| WO | 2016097784 A1 | 6/2016 |

OTHER PUBLICATIONS

Wikipedia contributors, "Roller screw," Wikipedia, The Free Encyclopedia, https://en.wikipedia.org/w/index.php?title=Roller_screw&oldid=1171480118 (accessed Sep. 14, 2023).

Wikipedia contributors, "Ball screw," Wikipedia, The Free Encyclopedia, https://en.wikipedia.org/w/index.php?title=Ball_screw&oldid=1147986023 (accessed Sep. 14, 2023).

* cited by examiner

CONSTRUCTION EQUIPMENT PROVIDED WITH A SPECIFIC ARRANGEMENT TO ALLOW TITLING MOVEMENT WITHIN ELECTRIC ACTUATOR

TECHNICAL FIELD

The invention relates to a construction equipment, specifically to a fully electrically driven construction equipment.

The invention is applicable on working machines within the fields of industrial construction machines or construction equipment, in particular excavators and articulated haulers. Although the invention will be mainly described with respect to an excavator, the invention is not restricted to this particular machine, but may also be used in other working machines such as articulated haulers, dump truck and backhoe loaders, loaders, skid steer loaders, as far as it is equipped of linear cylinders to drive the movement of the equipment.

BACKGROUND

In recent years, there has been a clear trend towards the electrification of vehicles, and thus a move away from the use of fossil fuels that cause greenhouse gas emissions. Electric vehicles also have the advantage of being much quieter than their thermal counterparts.

This trend is now spreading to construction machinery which, until now, has included a combustion engine driving a hydraulic pump. Gradually, internal combustion engines will be replaced by electric motors. There are also solutions to replace the hydraulic system/circuit and the various cylinders that make it up: today, one of the solutions consists of replacing the hydraulic cylinders by electric cylinders. In practice, however, this poses many problems, including the fact that electric cylinders are very sensitive to induced efforts and shocks transmitted through the structural parts of the equipment during working conditions.

So far, electric cylinders do not give entire satisfaction in terms of reliability and robustness, which is why other systems of actuation have been developed in replacement.

An example of such system is an electric actuator for construction equipment that is described in patent application EP4036316A1. This type of actuator comprises a ball screw or roller screw system allowing a carriage to be moved in translation under the effect of the rotation of a threaded rod. This carriage is guided by one or more rails serving as guide means. Typically, these guides are attached to the framework, i.e. the metal carcass of the construction machine. The problem with this type of actuator is that in working conditions, i.e. on site, the framework deforms under the effect of the reaction forces absorbed by the machine, so that the distance between the carriage and the threaded rod can vary from one point to another on the carriage's stroke. Radial forces are then transmitted to the ball or roller screw system. The ball or roller screw system is not designed to withstand such forces, so it loses its efficiency and damage can occur in the long term. Also, manufacturing and assembly tolerances can lead to an undesirable offset or a misalignment between the threaded rod and the guiding means, so that the efficiency of the system is not optimal.

An obvious solution to this is to reinforce the framework, so as to avoid deformation of the latter in working conditions. However, this means oversizing the framework, which considerably increases the overall weight of the moving parts. As a result, this would require more powerful and bigger actuators. All in all, this would considerably increase the cost of the machine.

SUMMARY

Thanks to the invention, the threaded rod can tilt in order to compensate for a deformation of the framework, e.g. during digging operation. In detail, under operating conditions, the framework can deform under reaction forces and loads to which it is subjected. The threaded rod automatically move to realign with guiding means that are fixed relative to framework and therefore rectify any misalignment or offset between threaded rod and axial guiding means. This enables to make sure that roller or ball screw system always operate in optimal design conditions, in which the axial guiding means are parallel to threaded rod. As a result, the roller or ball screw system operates with a yield that is optimum and the risk of damage or failure is reduced. In other words, this makes the actuator design more robust in comparison with a design where the threaded rod would be supported without any possibilities to move relative to guiding means.

This specific design also enables to compensate for any misalignment or offset, originating from manufacturing tolerances.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
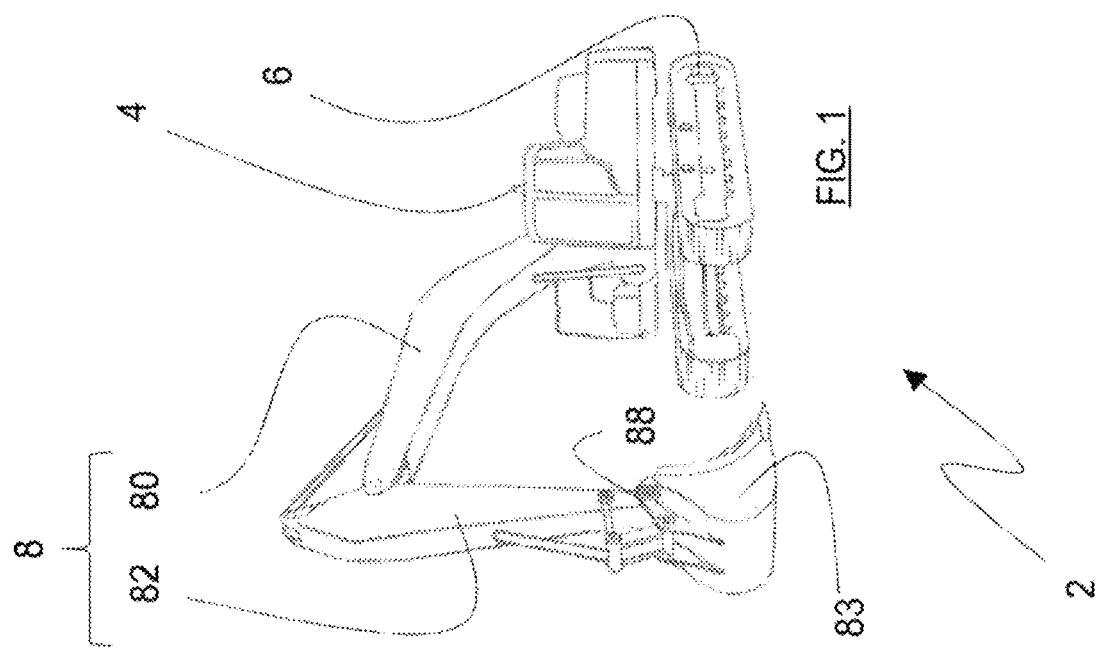
FIG. 1 is a perspective view of a construction equipment, e.g. an excavator, according to the invention.

FIG. 1 shows a construction equipment 2 (also referred to as a "construction machine" or "work machine"), which in the example is an excavator. Obviously, and as mentioned above, the invention is not limited to this particular example as it can be applied to any other construction equipment.

The construction machine 2 comprises an upper frame (also known as "platform") 4 that can be pivoted around a vertical axis. The upper frame 4 includes the driver cab. It is rotationally mounted on a lower frame equipped with a pair of continuous tracks 6, e.g. caterpillars tracks 6.

The excavator 2 further includes an excavator arm 8, which comprises a boom 80 that is rotatable relative to the upper frame 4 and a dipper 82 (also known as "stick" or "arm") that is rotatable relative to the boom 80. Besides, a tool 83, such as a bucket, is removably attached to the end of the dipper 82.

Boom 80 and dipper 82 are considered as being part of the 'framework' or 'frame' of construction equipment 2. According to one example, framework is made of metal sheets assembled together by welding and/or fastening. In other examples, framework could be made of a truss (i.e. rigids bars) and/or molded components.

Figure 2:
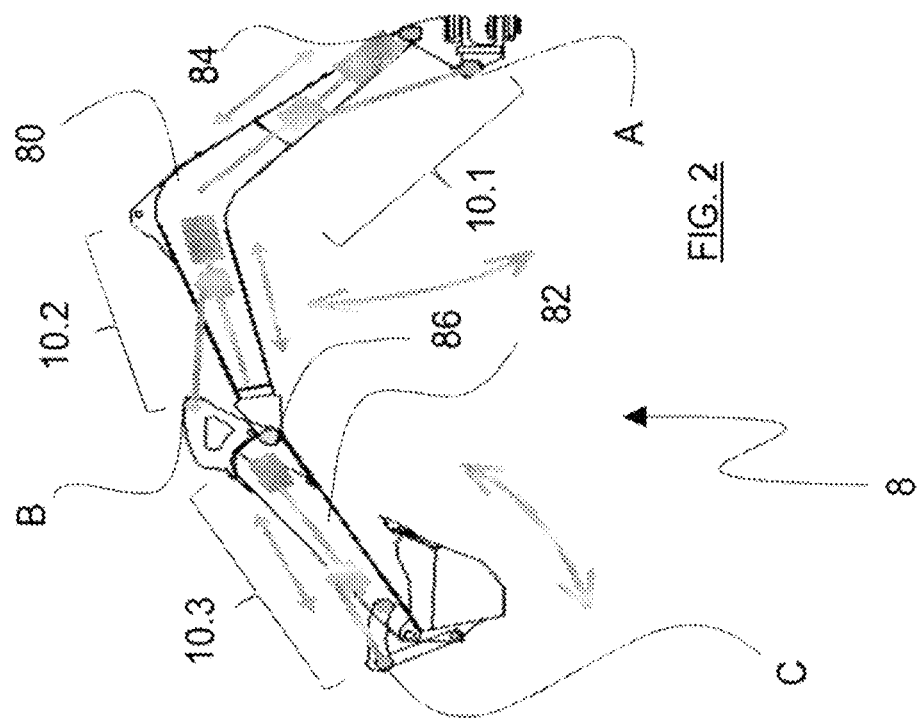
FIG. 2 is a side view of the excavator arm, including a boom, a dipper and bucket.

In reference to FIGS. 1 and 2, Numeral reference 84 denotes the articulation (or hinge) between boom 80 and upper frame 4, Numeral reference 86 denotes the articulation (or hinge) between boom 80 and dipper 82 and Numeral reference 88 denotes the articulation between tool 83 and dipper 82 (Cf. FIG. 1).

As a general rule, and in compliance with the applicable standards, the axes represented in dash dot on the figures are axes of rotational movement.

In known manner, the articulations 84, 86 and 88 allow rotating the boom 80, dipper 84 or tool 83 around an axis of rotation parallel to the ground surface. Accordingly, when the construction equipment lays on a flat surface, said axis or rotation is horizontal. However, in variant, some construction equipment include articulation(s), linked to actuator(s), whose axis of rotation is not parallel to the ground.

In the example, the boom 80 is angle-shaped, which means that it includes two straight segments that delimit between them an angle of approximately 120°.

The construction machine 2 is specific in that it is entirely electric. In other words, the construction machine 2 has neither a thermal engine, nor hydraulics. The continuous tracks 6 are driven by at least two electric motors (not shown), respectively one for each track 6, and the movements of the excavator arm 8 and tool 83 are achieved thanks to electric actuators, respectively three electric actuators 10.1, 10.2 and 10.3 from FIG. 2, whose characteristics are detailed below.

Figure 3:
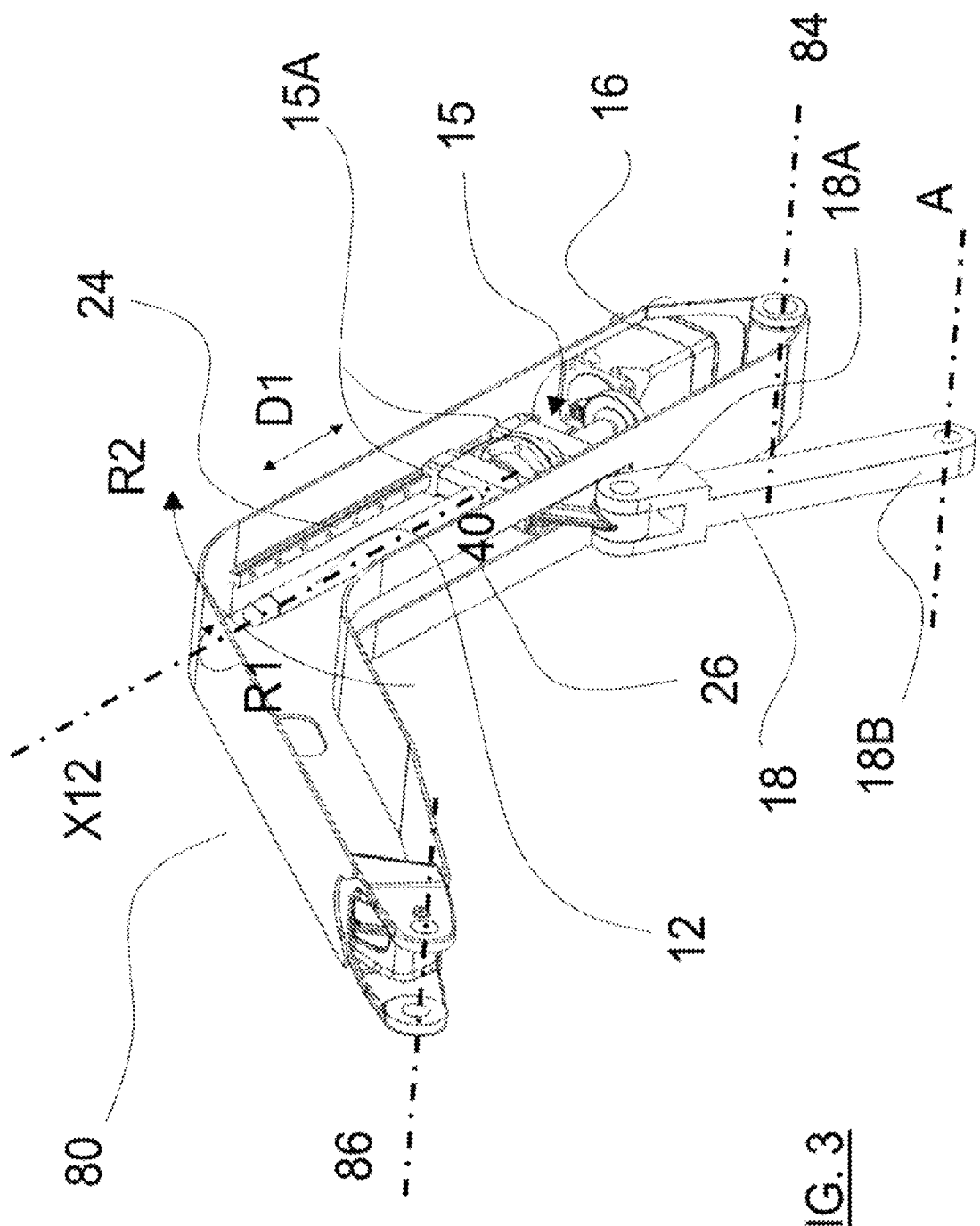
FIG. 3 is a partial and detailed view of the excavator boom, of FIG. 2.

As shown on FIG. 3, each actuator consists of a rod 12, extending along a longitudinal axis X12 (which can also be considered as a central axis or revolution axis) and a sliding element 15 (which can also be called "carriage"), movable along the rod 12.

Each actuator also comprises an electric motor 16, for converting electrical energy into movement of the sliding element 15 along the longitudinal axis X12. For instance, electrical energy can be supplied from a rechargeable on-board battery pack (not shown), e.g. a Lithium-ion battery pack. The electric motor 16 is preferably a DC motor, e.g. a Brushless DC motor (BLDC). However, in variant, it could also be an AC motor.

Preferably, a reducer or transmission organ 42, e.g. a gear reducer or a belt drive, is provided between the output shaft of the motor 16 and one end of threaded rod 12, to transmit the torque of the motor 16 to rod 12. Precisely, and as shown on FIG. 4, gear reducer 42 comprises a first pinion 42A provided on motor output shaft and a second larger pinion 42B meshing with first pinion.

Each actuator further includes a connecting rod 18, comprising a first end 18A which is articulated to the sliding element 15 about a pivot axis perpendicular to the longitudinal axis X12 and a second end 18B which is articulated to one element of the construction machine 2.

In the embodiment of FIGS. 1 and 2, the excavator 2 includes a first actuator 10.1 for moving the boom 80, whereby the second end 18B of the connecting rod is attached to a hinge A of the platform/upper frame 4. The excavator 2 further includes a second actuator 10.2 for moving the dipper 82, whereby the second end 18B of the connecting rod is attached to a hinge B of the dipper 82 and a third actuator 10.3 for moving the tool 83, whereby the second end 18B of the connecting rod is attached to a hinge C of the tool 83.

Accordingly, in the embodiment of FIGS. 1 and 2, the element to which is attached connecting rod 18 can be the upper frame 4, the dipper 82 or the tool 83.

In the example of FIG. 2, the hinges B and C to which are attached the second ends 18B of connecting rods 18 are part of the element to be actuated, while hinge A belongs to another element, resp. the upper frame 4.

As shown on FIG. 3, each actuator includes translational or axial guide means 24 to guide the movement of the sliding element 15 along the longitudinal axis X12.

These guide means can take several forms: Preferably, guide means consists of at least one rail 24 that is fixed to the framework, e.g. boom 80. Typically, said rail 24 is fastened to the framework using a series of fasteners such as bolts, screws or rivets.

In the example, carriage 15 is provided with at least one, preferably two rams (e.g. slides) 15A that are engaged to rail 24. In order to ensure translational/axial frictionless guidance, said two rams (or slides) have a cross-section complementary to that of rail 24. In particular, said two rams each include a set of balls rolling on the rail, which allows frictionless guidance. As this is a well known technology, more details can be found on the internet.

Each actuator also includes a ball screw or roller screw mechanism or system (not shown in detail). The principle of this mechanism is that it includes a threaded rod and a nut and that rolling elements, such as balls or rollers, are provided to limit friction between the rod and the nut. As this type of helical connection is well known from the state of the art, no further details are given here. There is a lot of information on the internet on this subject, for example on the following internet pages, the content of which is incorporated herein by reference:

https://en.wikipedia.org/wiki/Roller_screw;
https://en.wikipedia.org/wiki/Ball_screw.

On the drawings, the threaded rod is represented with numeral reference 12, while numeral reference 14 denotes the nut.

In the example, sliding element/carriage 15 is connected to the nut (or nut element) 14 of the ball screw or roller screw mechanism to which it is referred to above. This means that the sliding element 15 is not part of the ball/roller screw mechanism as such.

In reference to FIG. 3, when electric motor 16 is switched on (i.e. supplied with electric power), it drives rod 12 in rotation around axis X12, as depicted by arrow R1. Thanks to the helical link, the rotation of rod 12 leads to a translation of the nut and carriage assembly 14+15 forward or backward along rod 12 (Cf. Arrow D1), depending on the rotation direction of the E-motor 16. As a result, connecting rod 18 pivots around hinge A and forces the boom 80 to rotate around the articulation 84 between boom 80 and upper frame 4 (Cf. Arrow R2). Accordingly, the electric actuator 10.1 forms a simple means to move the boom 80 up or down, depending on the sense of rotation of the E-motor 16.

Typically, the axis of articulation between sliding element 15 and connecting rod 18 is parallel to the axis of articulation between connecting rod 18 and said first element (e.g. upper frame 4, dipper 84 or tool 83) of the construction equipment to which it is referred to above. Also, it can be noted that the axes of articulations provided at the ends 18A and 18B of connecting rod 18 are parallel to the axes of articulations 84, 86 and 88 of the excavator 2.

Figure 4:
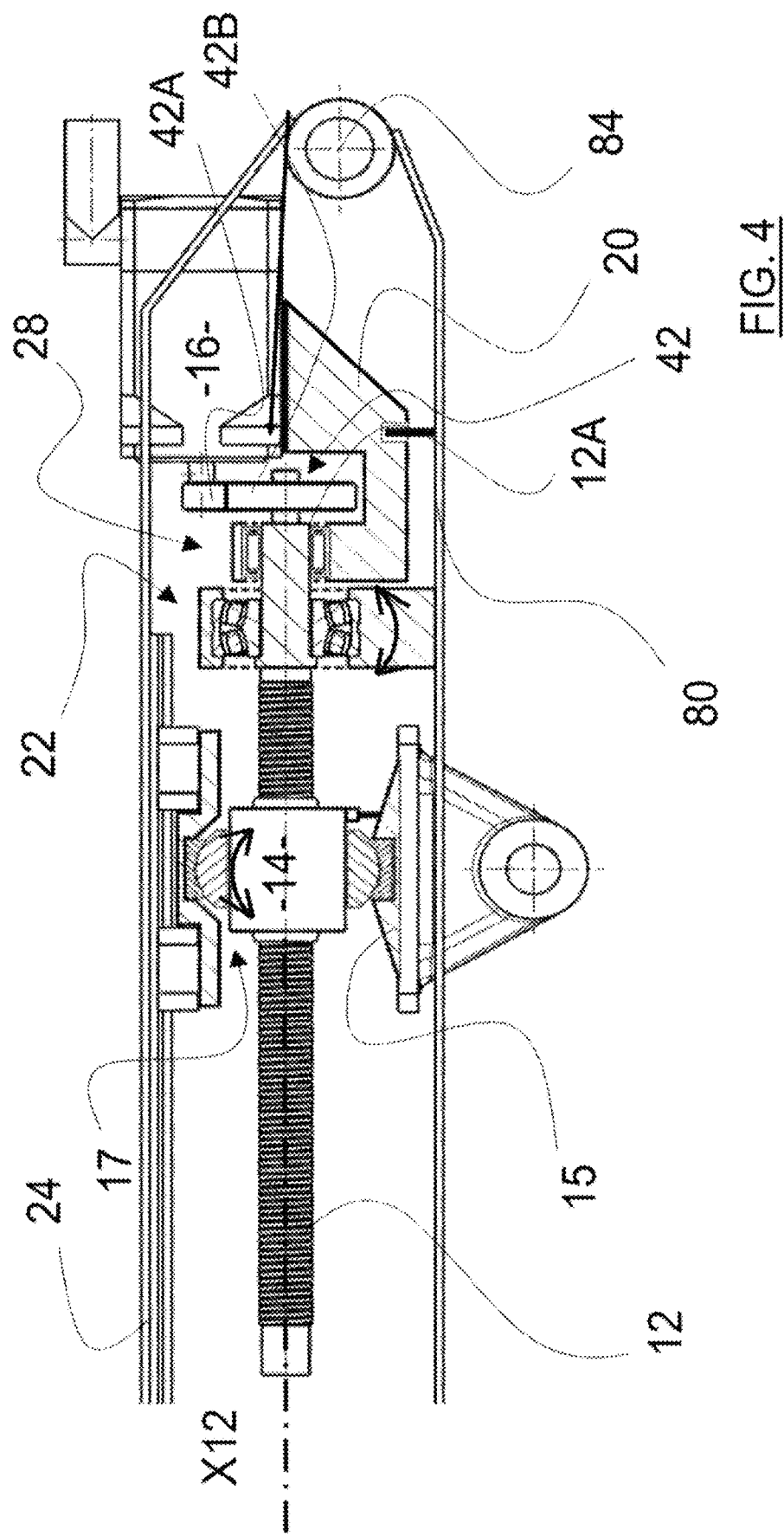
FIG. 4 is an inside view of one electric actuator of the construction equipment, according to a first embodiment of the invention.

FIG. 4 shows in more detail the actuator according to a first embodiment of the invention.

The actuator comprises at least one support element 22 that makes the connection between threaded rod 12 and framework 80. This support element 22 is fixed relative to framework 80. It is designed to allow the rod 12 to rotate around its central axis X12 and also to support the threaded rod 12 in such manner that threaded rod 12 can tilt/incline, to some extent, relative to framework 80 around any axis perpendicular to rod longitudinal axis X12 (similarly to a ball joint).

In the example, the "extent" to which it is referred to above, i.e. the possibility of tilting or inclination of threaded rod 12 allowed by support element 22, is inferior to 2°, preferably about 1°.

Figure 5:
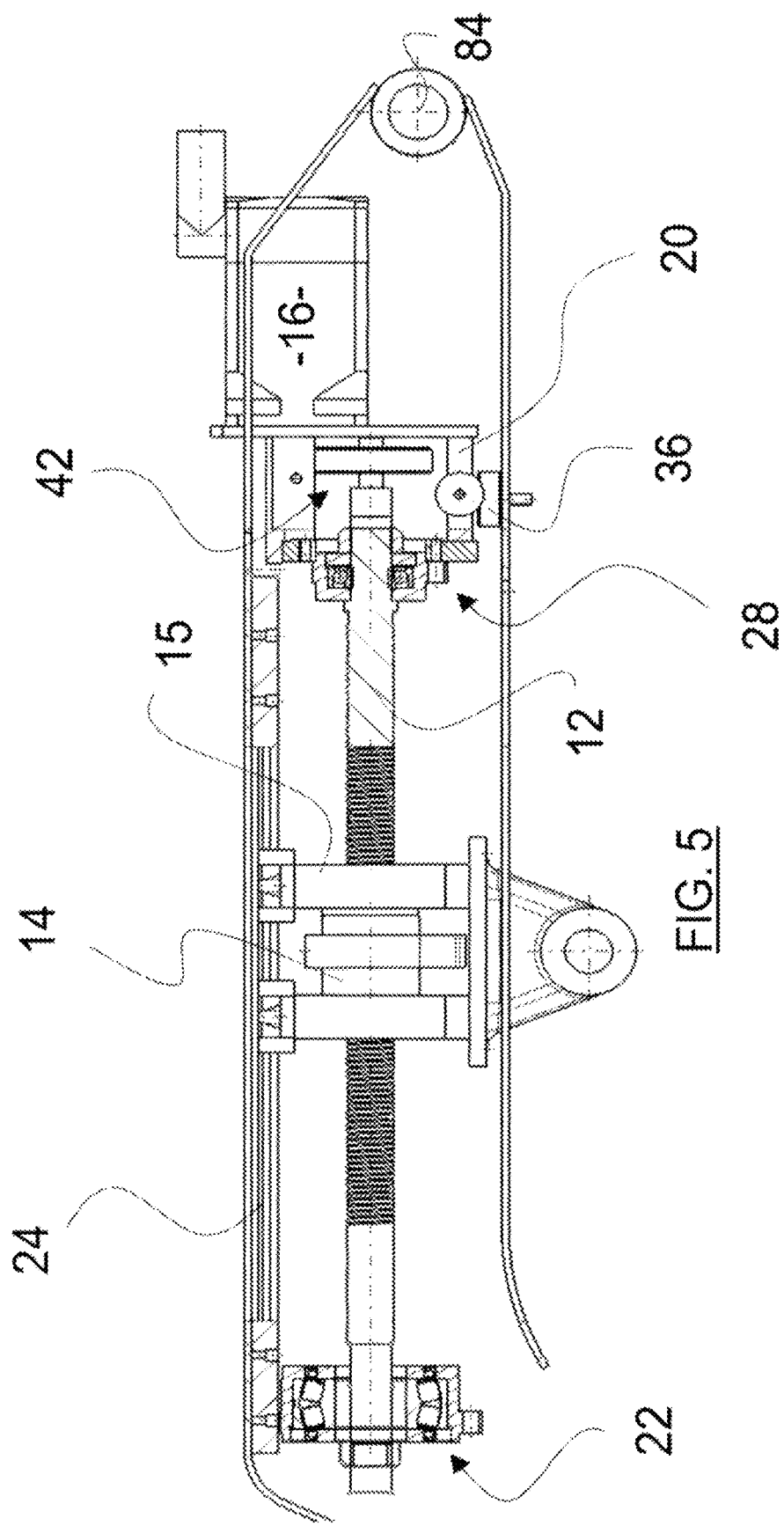
FIGS. 5, 6 and 7 are views similar to that of FIG. 4, representing three other embodiments of the invention.

In the example of FIG. 5, support element 22 provides direct support to threaded rod 12.

In detail, as its name indicates, support element 22 serves to support or hold the threaded rod 12 and ensures rod positioning/centring with respect to framework 80. Accordingly, support element 22 delimits a hole for receiving the rod 12.

In this embodiment, support element 22 consists of a bearing provided with rolling elements, also known as rolling bearing. Specifically, it is a spherical roller bearing 22 that includes two ranges of rollers arranged between an inner ring and an outer ring. As shown on FIG. 4, outer ring is fixed relative to framework 80. Specifically, outer ring is integral with framework 80.

Thanks to the incurved shape of the rolling surfaces, tilting (or ball-jointing) is possible. This means that the bearing allows inner ring and/or outer ring to deviate from the initial configuration in which the central axis of inner ring is coincident (or superimposed) with that of outer ring. In other words, bearing is configured to allow the two rings to move one relative to the other and reach a configuration of misalignment where central axis of a first ring is not perfectly parallel to central axis of second ring. The bearing is designed so that it operates normally without reaching the end of the tilting possibility. As detailed above, this ball joint can compensate for poor coaxiality (i.e. misalignment) or undesired offset resulting from manufacturing imperfections and/or framework deformation under load during work conditions.

The advantage of having the rod 12 that can tilt relative to framework 80 is that it allows compensating a relative movement between the guiding means 24 and the rod 12, induced by a deformation of framework 80 and therefore that it prevents the generation of a misalignment between the guiding means (e.g. the rail 24) and the rod 12. In other words, rod 12 follows the movement/rotation of the guiding means by taking advantage of the specific design of support element 22 so that rod 12 and guiding means 24 remain parallel to each other and equidistant even if the framework 80 gets deformed. Typically, in operating conditions, the framework of construction equipment deforms as its rigidity is limited for weight reasons. Accordingly, the guiding means that are attached to it also deform or move as a consequence of framework deformation. The idea is therefore to take advantage of the support element design or configuration to ensure that the rod 12 remains parallel and equidistant to guiding means 24. Indeed, any misalignment between the two parts would necessarily lead the electric motor 16 to provide more effort and the efficiency of the roller screw or ball screw system would be reduced, possibly leading to important damages.

Figure 10:
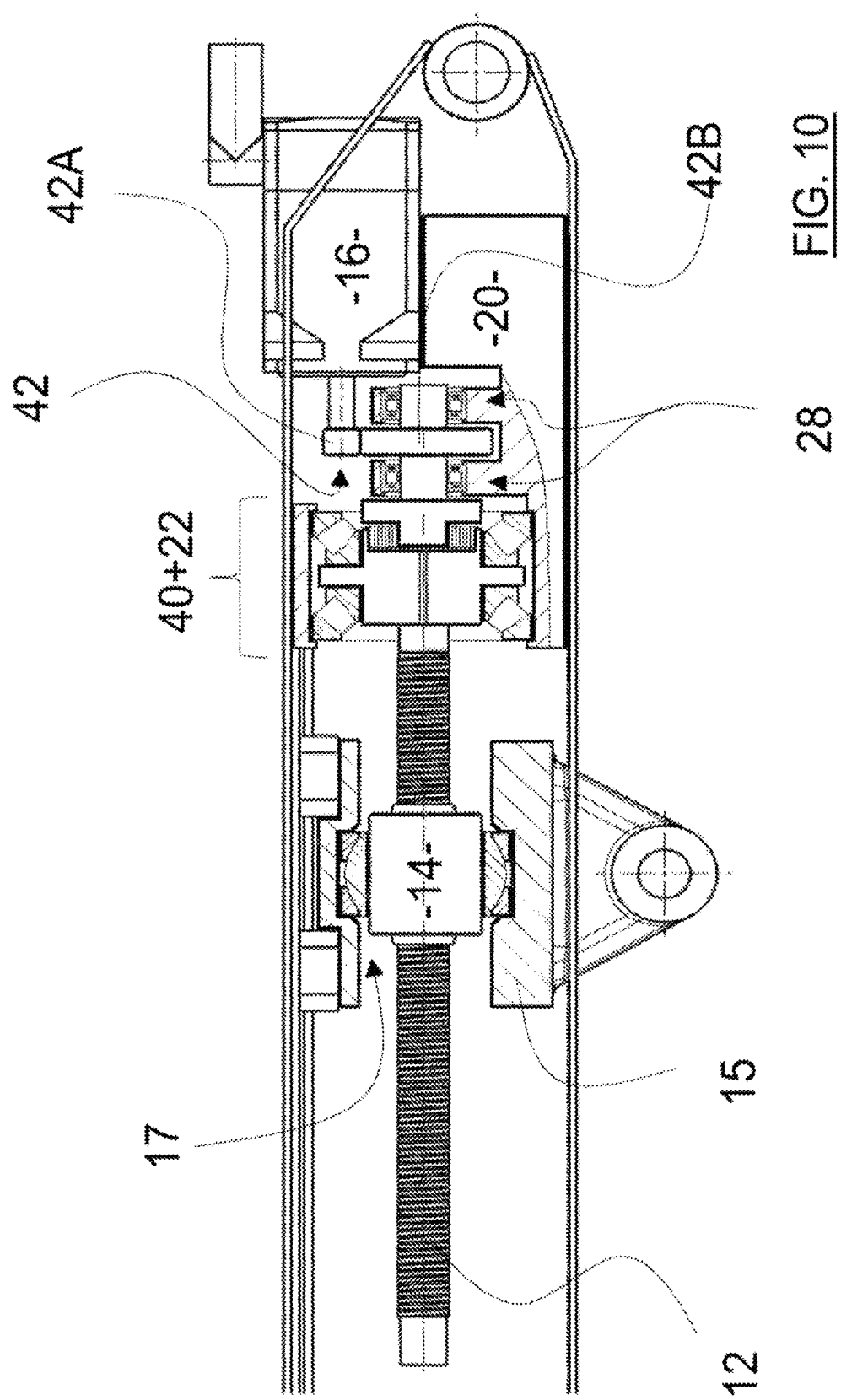
FIGS. 10 and 11 represent two additional embodiments of the invention.

As an alternative (not shown), the spherical roller bearing 22 could be replaced by two back to back (or face to face) spherical roller thrust bearings (such as represented on FIG. 10).

Basically, any bearing or bearings combination that makes it possible for the inner ring to tilt and rotate relative to outer ring could be used. As all these bearings are available on the market, they are not detailed further.

Advantageously, the actuator comprises a motor chassis 20 which supports/holds the electric motor 16. A bearing 28 connects the threaded rod 12 to the chassis 20. In detail, bearing 28 consists of a rolling bearing, e.g. needle bearing, defining a hole in which is received one end of rod 12. Said bearing 28 is integral with motor chassis 20. As a result, it can be said that the motor chassis 20 bears the threaded rod 12 as the connection is achieved by one or more bearings. In this paper, the verb "bear" is therefore employed only where the connection in question is achieved by a bearing element, such as rolling bearing or plain bearing.

Accordingly, the threaded rod 12 and the electric motor 16 are indirectly connected to each other via the motor chassis 20, so that the motor 16, the motor chassis 20 and the threaded rod 12 form a single unit.

In the example, the threaded rod 12 comprises a terminal portion or end 12A connected to the output shaft of the electric motor by a gear-type reduction gear. The bearing 28 to which it is referred to above is disposed at that end, i.e. end 12A. Also, the spherical roller bearing 22 to which it is referred to above is also disposed around this end 12A of the rod, just beside the bearing 28 between said bearing 28 and the nut 14.

As mentioned above, carriage 15 is translationally or axially linked/connected with the nut 14 and its (translational/axial) movement is guided by rail 24. According to this example, the carriage 15 is mounted around the nut 14 by means of a spherical plain bearing 17. This spherical plain bearing 17 is composed of two spherical parts nested inside each other. Specifically, the inside portion is part of the nut 14, while the outside portion belong to carriage 15. This makes it possible for the carriage 15 to tilt or incline, to some extent, around the nut 14 around any direction or axis crossing the center of the rings, similarly to a ball joint.

In a variant not shown, spherical plain bearing 17 could be replaced by a double angular contact spherical plain bearing or by two back-to-back (or face to face) angular contact spherical plain bearings. A proper ball joint is also an option.

The spherical contact characteristic of a spherical plain bearing is that it does not allow any translational degree of freedom, so that the nut and the carriage are fixed in translation/axially one relative to the other. Accordingly, translation of nut 14 resulting from rod rotation causes an axial movement of carriage 15 along rail 24.

In this example and as it can be seen on FIG. 4, motor 16 is not completely encased inside framework 80: One portion of motor 16 projects/extends outside framework 80. Obviously, in variant, motor 16 could be completely integrated into framework 80.

FIG. 5 shows a second embodiment of the invention, in which support element 22 is arranged at the opposite end of threaded rod 12, which is at the end opposite to motor 16 or motor chassis 20.

In this example, support element 22 is a spherical roller bearing comprising two ranges of rollers arranged between an inner ring and an outer ring. The outer ring is fixed relative to framework 80. In detail, this outer ring is fastened to framework 80 using fasteners such as bolts or rivets. Inner ring is in contact with threaded rod 12. Typically, inner ring is coaxially arranged around rod 12. In a variant not shown, spherical roller bearing 22 could be replaced by two back to back (or face to face) spherical roller thrust bearings.

Therefore, the spherical roller bearing 22 shown on FIG. 5 connects directly threaded rod 12 to framework 80.

As for the embodiment of FIG. 4, and as its name indicates, the spherical roller bearing 22 enables the threaded rod 12 to tilt, to some extent, relative to framework 80 around any axis perpendicular to rod longitudinal axis X12 (similarly to a ball joint).

Also, bearing 28, connecting rod 12 to motor 16, consists of a ball bearing that is fastened to motor chassis 20 using fasteners (not shown).

In a variant not shown, bearing 28 could be replaced by any other rolling bearing, e.g. needle bearing or roller bearing.

In this example, nut 14 is sandwiched by or within the carriage 15. This means that nut 14 is arranged axially in the center of the carriage 15 and that nut 14 is arranged axially between two portions of carriage 15. Accordingly, when the nut 14 is driven axially in translation, it abuts, directly or indirectly, against carriage 15 and push it so that it (i.e. the carriage) slides along the rail 24.

Advantageously, the motor chassis 20 rests on at least one, preferably two or more elastic pads 36. This is to make sure that motor 16 does not move or tilt under its own weight and that it does not rotate about axis X12 because of resistive torque applied to motor 16. Also, the elastic nature of the pads 36 allows the movement of the rod 12 relative to the frame 80 to which it is referred to above since pads 36 can be compressed or stretched to absorb a tilting of rod 12.

Figure 6:
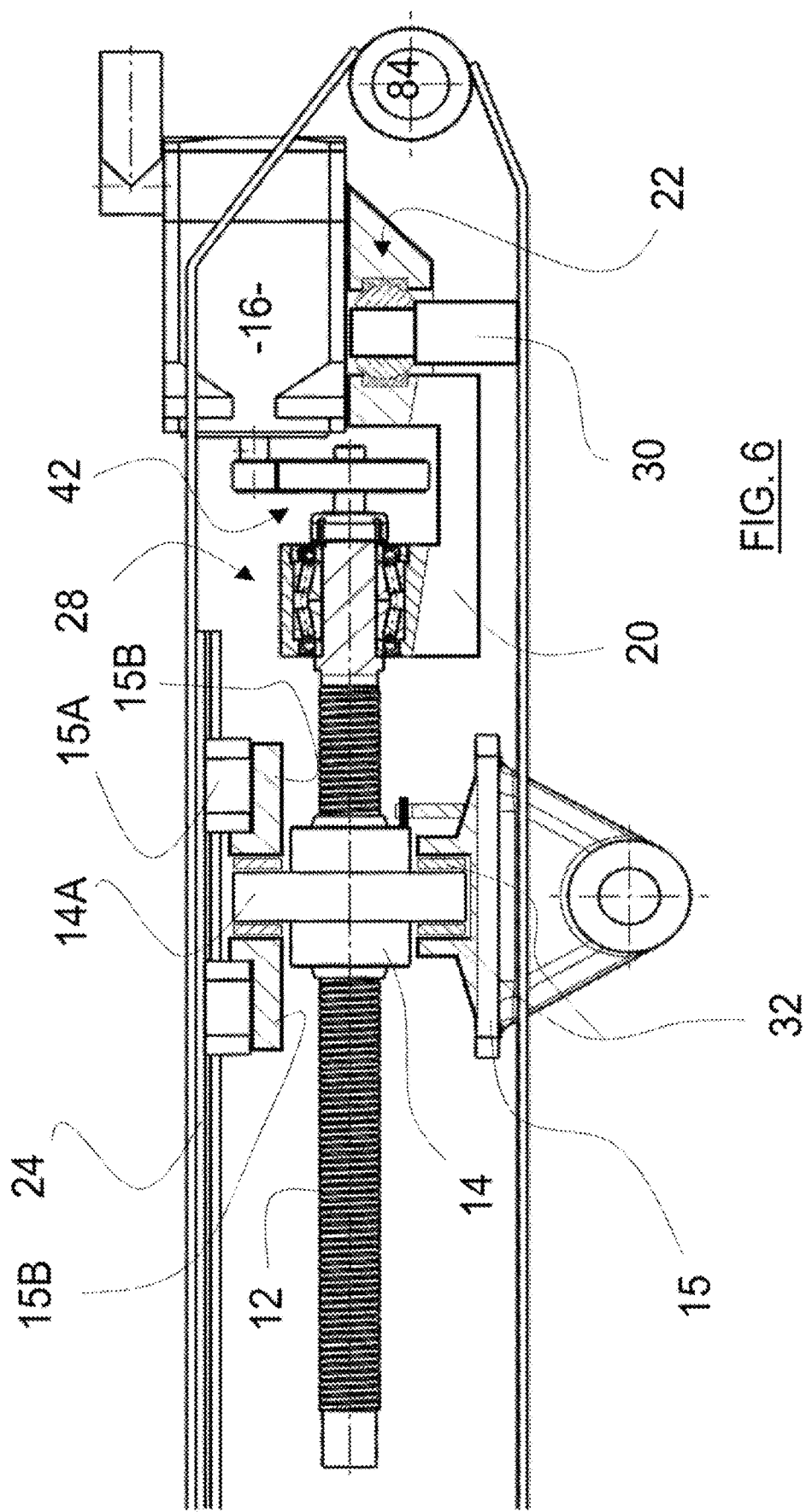

FIG. 6 shows a third embodiment of the invention. In the following, and for the sake of brevity, only the differences from the first two embodiments are described below.

In this third embodiment, the main difference concerns the support element which, in this example, consists of a ball-and-socket joint (or ball joint) 22 arranged between the motor chassis 20 and the framework 80. This ball-and-socket joint 22 includes an inner portion, respectively the ball, and an outer portion, respectively the socket, which is integral with the motor chassis 20 and which is composed of at least one spherical shell complementary to the ball constituting the inner part. In the example, the inner part of the ball joint (i.e. the ball) is fitted around a cylinder 30 attached to or integral with the framework 80. Cylinder 30 extends perpendicularly from framework 80. Obviously, many other fitting arrangements are possible to achieve the same function: Typically, the socket portion could be part of framework 80, while the ball portion could be part of motor chassis 20.

In a variant not shown, ball joint 22 could be replaced by a spherical plain bearing.

Accordingly, the motor chassis 20 can tilt, to some extent, relative to framework 80 around any axis passing by the center of ball and socket joint 22.

A bearing 28 connects threaded rod 12 to motor chassis 20. In particular, bearing 28 connects the axial end of rod 12 to motor chassis 20. Bearing 28 consists of a double roller bearing that ensures proper frictionless connection between moving threaded rod (intended to rotate around longitudinal axis X12) and motor chassis 20.

Thanks to bearing 28, rod 12 and motor chassis 20 form a single assembly, which means that the possibilities of relative movement between motor chassis 20 and framework 80 to which it is referred to above, allows rod 12 to tilt, to some extent, relative to framework 80 around any axis passing by the center of ball and socket joint 22.

By extension, and since a ball and socket joint enables a tilting movement in any direction, it is not untrue to say that rod 12 can tilt around any axis perpendicular to rod longitudinal axis X12.

Accordingly, in this example/embodiment, support element 22 provides indirect support to rod 12. In other words, support element 22 supports motor chassis 20 which itself provides support to threaded rod 12, which is why we speak of "indirect support".

The nut 14 is sandwiched by or within the carriage 15. Typically, nut 14 is arranged inside the carriage 15 and at least one disc 32, is interposed axially on each side between the nut 14 and the carriage 15. Specifically, the nut 14 comprises a central flange 14A interposed between two collars 15B belonging to the carriage 15. There is therefore a disc on each side of the flange 14A, making a total of two discs 32. Preferably, these discs are rigid frictionless discs, such as Teflon discs (registered trademark).

In a variant not shown, more than one disc could be provided on each side between flange 14A and collars 15B (multidisc configuration) to further limit friction. For example, it can be preferable to use a combination of rigid frictionless disc(s) with elastic disc(s).

Figure 7:
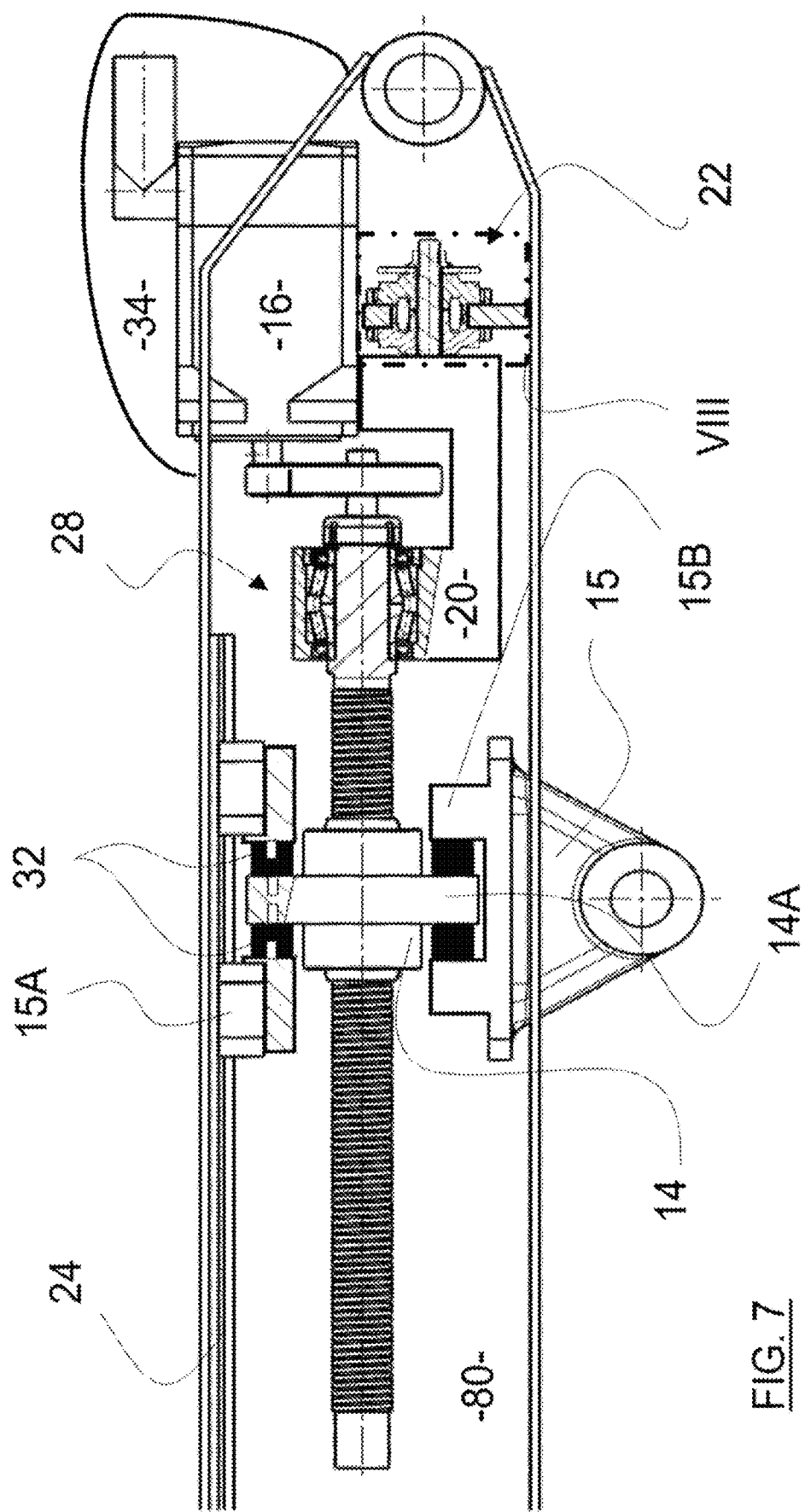

FIG. 7 shows a fourth embodiment of the invention which is similar to third embodiment. Although, some differences exist.

Figure 8:
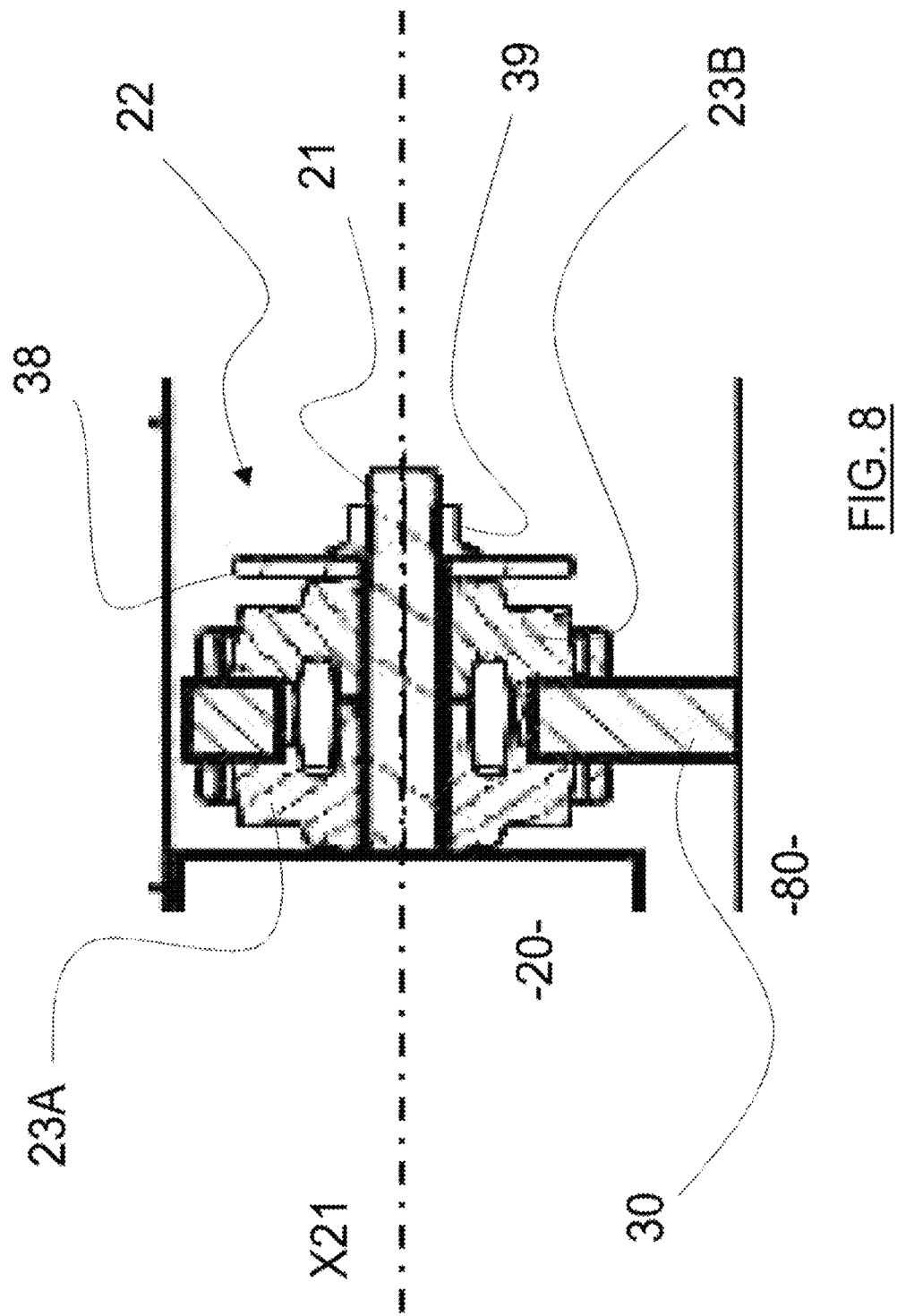
FIG. 8 is an enlarged view of rectangular area VIII on FIG. 7.

The main difference concerns support element 22, which here consists of an elastic mount/assembly. As shown on FIG. 8, the motor chassis 20 is provided with a stud/shaft 21 projecting/extending from the rest of the chassis along a longitudinal axis X21. In this example, axis X21 is parallel to axis X12 but it could be otherwise. In the specific arrangement of FIGS. 7 and 8, said shaft 21 is engaged through a bore/hole delimited by a plate 30.

Two elastic elements 23A and 23B are arranged on each side of plate 30. Said elastic elements 23A and 23B are held by a washer 38 and a nut 39.

Elastic elements 23A and 23B can compress or extend so as to enable shaft 21 to tilt or incline relative to plate 30, similarly to a ball and socket jointing.

As shaft 21 is fixed relative to motor chassis 20 which, itself, is fixed relative to threaded rod 12, the rod 12 can tilt or incline, to some extent, relative to framework 80 around any axis perpendicular to shaft axis X21, similarly to a ball and socket connection/jointing. By extension, it is not untrue to say that threaded rod 12 can tilt or incline, to some extent (e.g. 1° or 2°) around its own longitudinal axis X12.

Also, instead of discs, some damping devices, e.g. elastic elements/mounts 32, are arranged between central flange 14A and collars 15B. Thanks to their elastic nature, these damping devices 32 can get compressed or stretched and allow some tilting of nut 14 relative to carriage 15, or inversely.

In a variant not shown, the elastic mount/assembly can be any other type of rubber mounts or elastic system.

In this embodiment, motor 16 is encased inside a carter or protection envelope/cover 34 that covers the portion of motor 16 that extends outside framework 80. This enables to protect the motor 16 from external elements, such as rain, rocks, dust, etc. Typically, this carter 34 can be fastened to the framework 80 using bolts rivets or screws (not shown).

Figure 9:
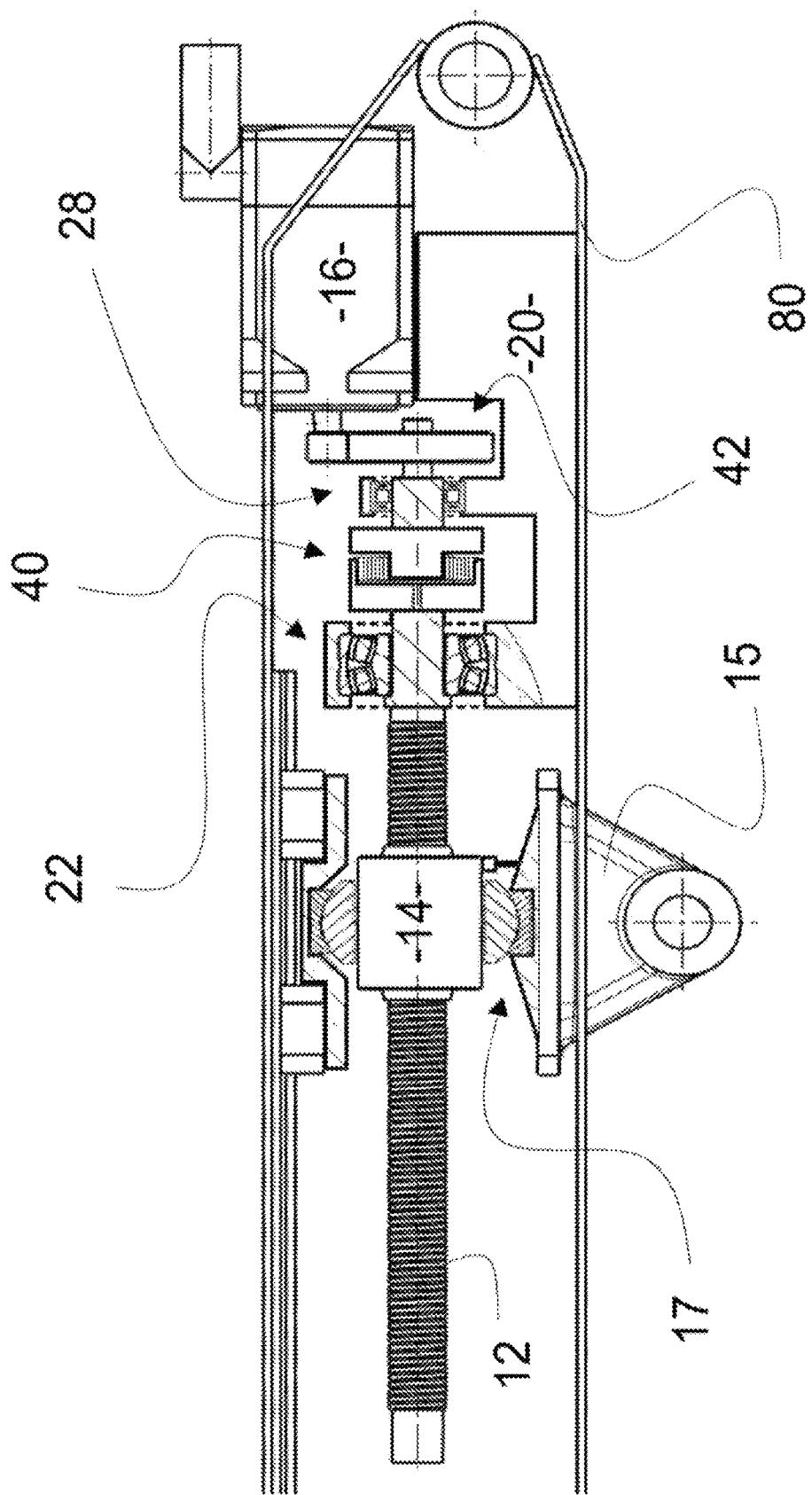
FIG. 9 is a view similar to that of FIGS. 4, 5, 6 and 7, representing a fifth embodiment of the invention.

FIG. 9 represent a fifth embodiment of the invention, in which the motor chassis 20 directly rests on framework 80, which means that motor chassis 20 is fixed relative to framework 80.

Bearing 28 is a simple rolling bearing.

The major difference in comparison with other embodiments is that the connection between threaded rod 12 and the output shaft of motor 16 or gear reducer is achieved by a well-known elastic coupling device/arrangement 40. This coupling device 40 consists of two jaws facing each other, between which is arranged an elastic crown. The jaws have a set of complementary teeth configured to engage so that the rotation of one jaw can be transmitted to the other. This elastic coupling device makes it possible to follow the movement of the rod relative to framework and ensure transmission of the torque from the motor to the rod in case of tilting inside support element 22. Also, the elastic element, e.g. made of elastomer, dampens shock and torsional vibrations.

In a variant not shown, applicable to fifth embodiment, the elastic coupling 40 could be replaced by one or two cardan joints or any other type of elastic coupling.

FIG. 10 represents a sixth embodiment of the invention, which is similar/close to that of FIG. 9.

One specificity of that embodiment is that two support elements 22 are provided. The support elements 22 are each arranged around elastic coupling device 40, which therefore enables to save space along axial direction. In detail, the two support elements 22 are two back to back (or face to face) spherical roller thrust bearing. In variant, these two elements could be replaced by one spherical roller bearing.

Also, two bearings 28 support the output shaft of reducer 42. These two bearings are arranged on each side of larger pinion 42B of reducer 42.

In respect of nut arrangement and as shown on FIG. 10, a double angular contact spherical plain bearing is advantageously provided between the nut 14 and carriage 15. Alternatively, it could be replaced by a spherical plain bearing or by two back to back angular contact spherical plain bearings.

Figure 11:
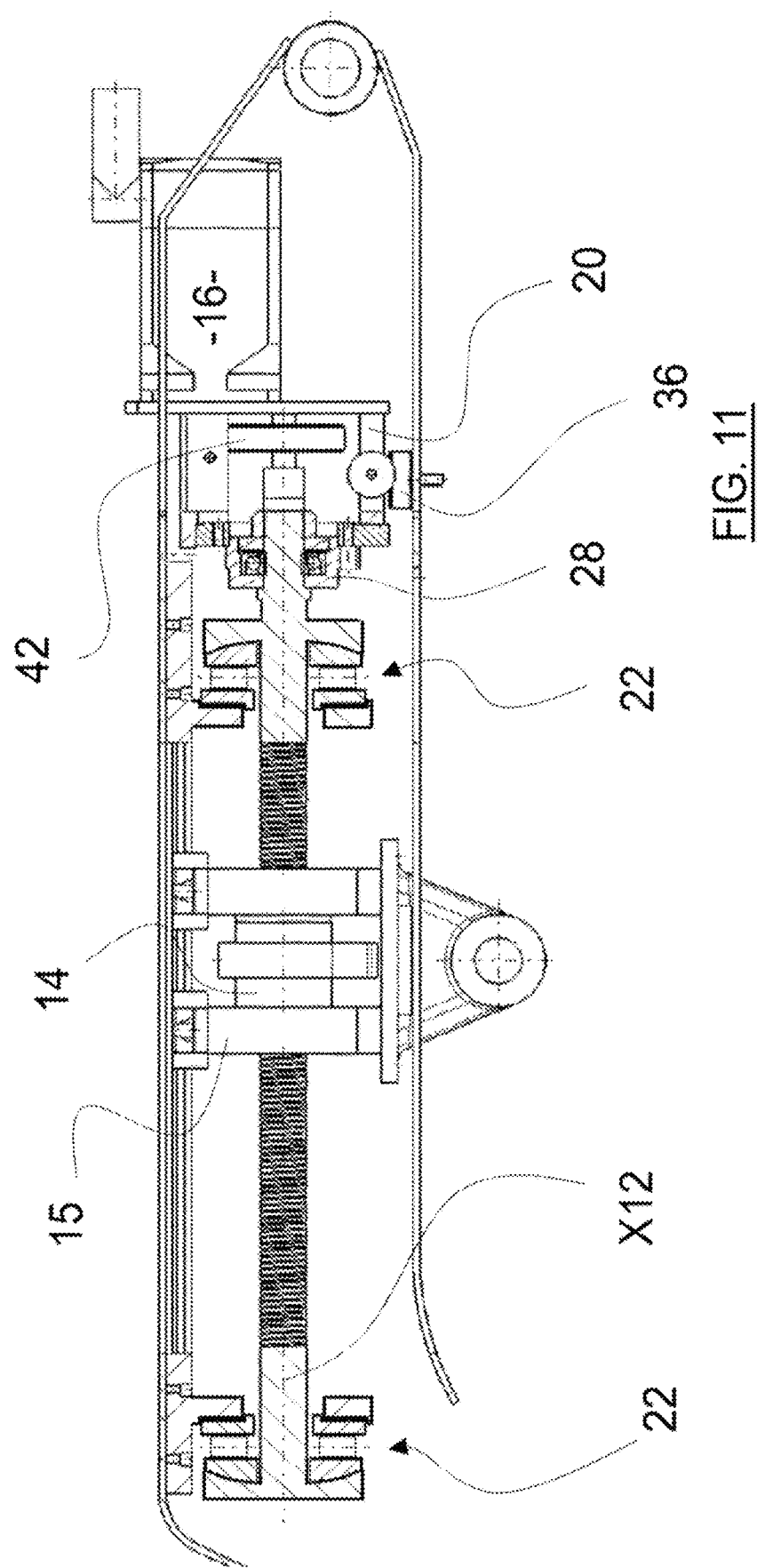

FIG. 11 represents a seventh embodiment of the invention, in which two support elements 22 are provided, respectively on each side of the nut 14 along axis X12. In detail, a first support element 22 is provided at one longitudinal end of rod 12, opposite to motor 16. The second support element 22 is arranged between nut 14 and bearing 28 connecting threaded rod 12 to motor chassis 20. In the example, bearing 28 is a rolling bearing, typically a ball bearing.

Advantageously, the two support elements 22 are two roller thrust bearings with adjustable washer. Alternatively, they could be replaced by two spherical roller thrust bearings. The two roller thrust bearings are concentrically arranged, meaning that they have the same center of rotation. Accordingly, the rod 12 can tilt, to some extent, around this point and therefore compensate for misalignment and/or undesired offset.

In known manner, each roller thrust bearing consists of two rings, respectively a first ring and a second ring, between which is arranged a series of rollers rolling in a plane perpendicular to rod axis X12 (vertical configuration). A washer is provided on the side of/next to first ring of roller thrust bearing. In the example, this washer is integral with rod 12.

Second ring of roller thrust bearing is fixed relative to machine framework 80. Typically, said second ring can be fastened to the framework 80 using bolts or rivets.

In operating conditions, the rotation of rod 12 around longitudinal axis X12 leads to a rotation of first ring which, in turn, forces the rollers to roll in contact with second ring, so that second ring doesn't rotate (rolling without sliding contact). It is the basic principle of a rolling/roller bearing, which is why it is not described further in this paper.

Washer and first ring have complementary spherical contact surfaces, so that a spherical contact is achieved and a titling movement is therefore possible. More precisely, the assembly made of washer and first ring can tilt relative to second ring, similarly to ball jointing. This enables to compensate for any misalignment and/or offset caused by framework deformation and/or manufacturing tolerances.

Figure 12:
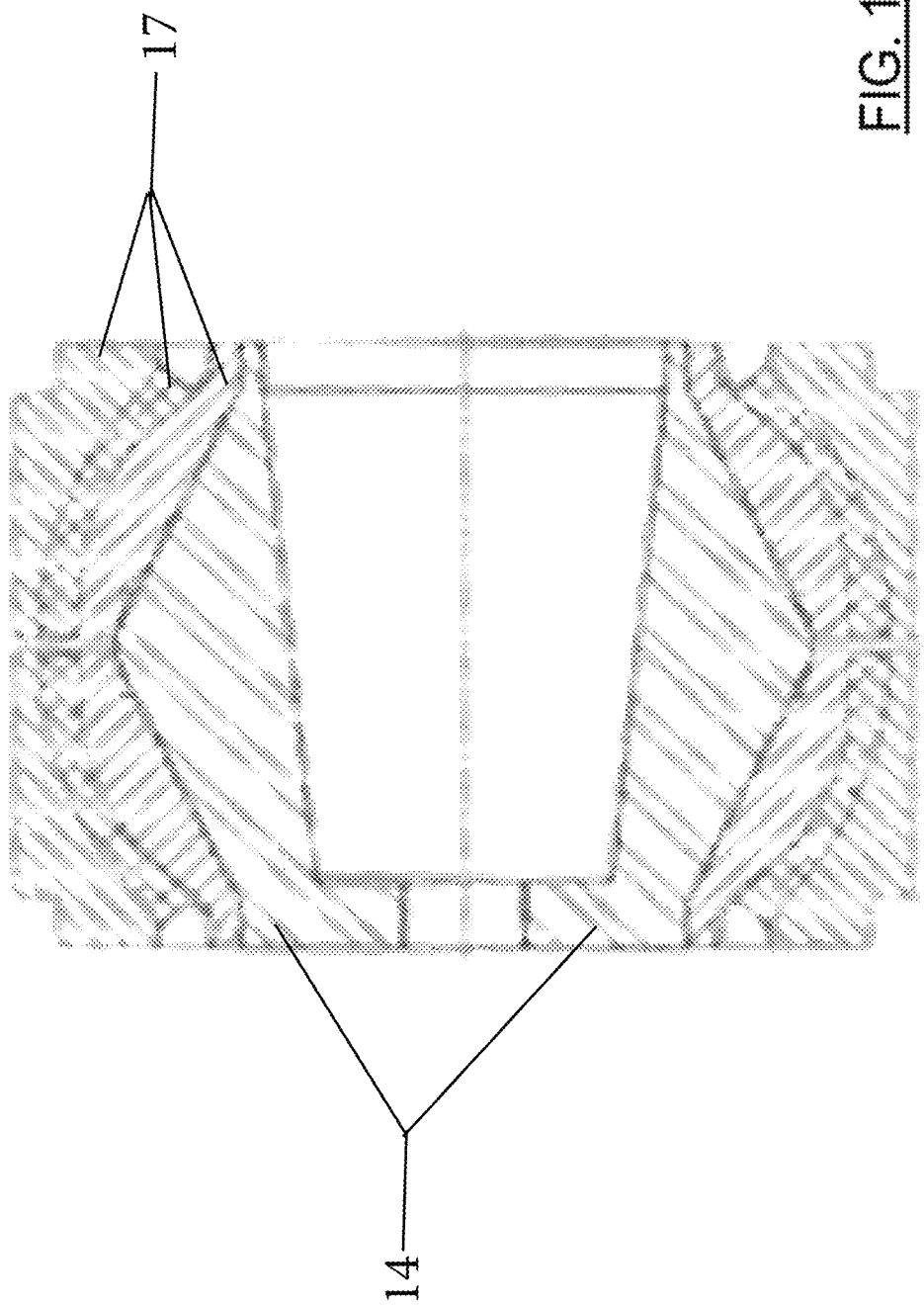
FIG. 12 represents a principle scheme showing an alternative connection or jointing that could be implemented to any embodiment of the invention.

In a variant shown on FIG. 12, connection means 17 between nut 14 and carriage 15 consists in a rigid rubber mount or assembly comprising a succession of superimposed rubber and/or rigid elements arranged around the nut 14. This rigid rubber mount is designed to withstand to axial efforts and to allow, to some extent, a tilting movement of nut 14 relative to carriage 15, similarly to ball joint.

It is to be understood that the present invention is not limited to the embodiments described above and illustrated in the drawings; rather, the skilled person will recognize that many changes, variants and modifications may be made within the scope of the appended claims.

The invention claimed is:

1. A construction equipment, comprising a framework and at least one electric actuator for moving at least one element of the framework, wherein the actuator comprises:
   a ball or roller screw system comprising a threaded rod and a nut forming a helical connection with the threaded rod,
   an electric motor for driving the threaded rod in rotation around a longitudinal axis, thereby forcing the nut to move axially along the threaded rod;
   a carriage which is axially connected with the nut, and
   an axial guide for guiding movement of the carriage, wherein the axial guide is fixed to the framework,
   at least one support element that connects, directly or indirectly, said threaded rod to said framework, wherein said support element is configured such that threaded rod can tilt, to some extent, relative to framework around any axis perpendicular to the longitudinal axis, and one end of the threaded rod is connected to an output shaft of a transmission organ through a cardan joint or an elastic coupling arrangement.

2. The construction equipment according to claim 1, wherein said support element is a rolling bearing arrangement inside which is received the threaded rod.

3. The construction equipment according to claim 2, wherein the rolling bearing arrangement includes at least two rings, among which a first ring is configured to rotate conjointly with the threaded rod and a second ring is fixed relative to the framework.

4. The construction equipment according to claim 1, wherein said support element is an elastic mount or assembly, having two elastic elements provided on two sides of a plate that is fixed relative to the framework.

5. The construction equipment according to claim 1, wherein said support element is a plain bearing or ball joint.

6. The construction equipment according to claim 1, wherein the actuator comprises a motor chassis supporting the electric motor and at least one rolling bearing connecting the threaded rod to the motor chassis.

7. The construction equipment according to claim 1, wherein the actuator comprises a bearing connecting the carriage around the nut.

8. The construction equipment according to claim 1, wherein the nut is sandwiched by or within the carriage along the longitudinal axis and wherein at least one element, a disc and/or elastic cushion, is interposed axially on each side between the nut and the carriage.

9. The construction equipment according to any claim 1, wherein the axial guide includes at least one rail fastened to the framework and wherein carriage includes at least one ram having a cross section complementary to that of the rail.

10. A construction equipment, comprising a framework and at least one electric actuator for moving at least one element of the framework, wherein the actuator comprises:
   a ball or roller screw system comprising a threaded rod and a nut forming a helical connection with the threaded rod,
   an electric motor for driving the threaded rod in rotation around a longitudinal axis, thereby forcing the nut to move axially along the threaded rod;
   a carriage which is axially connected with the nut, and
   an axial guide for guiding movement of the carriage, wherein the axial guide is fixed to the framework,
   at least one support element that connects, directly or indirectly, said threaded rod to said framework, wherein said support element is configured such that threaded rod can tilt, to some extent, relative to framework around any axis perpendicular to the longitudinal axis, and said support element is a rolling bearing arrangement inside which is received the threaded rod.

11. A construction equipment, comprising a framework and at least one electric actuator for moving at least one element of the framework, wherein the actuator comprises:
   a ball or roller screw system comprising a threaded rod and a nut forming a helical connection with the threaded rod,
   an electric motor for driving the threaded rod in rotation around a longitudinal axis, thereby forcing the nut to move axially along the threaded rod;
   a carriage which is axially connected with the nut, and
   an axial guide for guiding movement of the carriage, wherein the axial guide is fixed to the framework,
   at least one support element that connects, directly or indirectly, said threaded rod to said framework, wherein said support element is configured such that threaded rod can tilt, to some extent, relative to framework around any axis perpendicular to the longitudinal axis, wherein the actuator comprises a motor chassis supporting the electric motor and at least one rolling bearing connecting the threaded rod to the motor chassis.

* * * * *